(12) United States Patent
Speight

(10) Patent No.: US 8,654,733 B2
(45) Date of Patent: *Feb. 18, 2014

(54) RESOURCE ALLOCATION IN A PACKET-BASED RADIO COMMUNICATION SYSTEM

(75) Inventor: Timothy James Speight, Bristol (GB)

(73) Assignee: Sony Corporation, Tokyo (JP)

(*) Notice: Subject to any disclaimer, the term of this patent is extended or adjusted under 35 U.S.C. 154(b) by 753 days.

This patent is subject to a terminal disclaimer.

(21) Appl. No.: 12/471,333

(22) Filed: May 22, 2009

(65) Prior Publication Data

US 2009/0232110 A1    Sep. 17, 2009

Related U.S. Application Data

(63) Continuation of application No. 10/277,545, filed on Oct. 22, 2002, now Pat. No. 7,554,947.

(30) Foreign Application Priority Data

Oct. 23, 2001 (GB) .................................. 0125390.5

(51) Int. Cl.
*H04W 4/00* (2009.01)
(52) U.S. Cl.
USPC ............ 370/330; 370/335; 370/347; 370/468
(58) Field of Classification Search
None
See application file for complete search history.

(56) References Cited

U.S. PATENT DOCUMENTS

| | | | |
|---|---|---|---|
| 6,031,827 A | 2/2000 | Rikkinen et al. | |
| 6,721,294 B1 | 4/2004 | Bahrenburg et al. | |
| 6,973,064 B2 | 12/2005 | Terry et al. | |
| 6,993,002 B2 | 1/2006 | Pan et al. | |
| 6,996,082 B2 | 2/2006 | Terry et al. | |
| 7,554,947 B2 | 6/2009 | Speight | |

FOREIGN PATENT DOCUMENTS

| | | | |
|---|---|---|---|
| EP | 0841763 B1 | 5/1998 | |
| EP | 0913970 B1 | 5/1999 | |
| WO | WO-99/07170 A2 | 2/1999 | |
| WO | WO-00/52951 A1 | 9/2000 | |
| WO | WO-01/17304 A1 | 3/2001 | |

OTHER PUBLICATIONS

Great Britain Search Report mailed Apr. 29, 2002, for GB Application No. 0125390.5, 2 pages.
International Search Report mailed Jan. 29, 2003, for PCT Application No. PCT/GB02/04788 filed Oct. 23, 2002, 3 pages.

*Primary Examiner* — Michael J Moore, Jr.
(74) *Attorney, Agent, or Firm* — Oblon, Spivak, McClelland, Maier & Neustadt, L.L.P.

(57) ABSTRACT

A scheme for resource allocation for variable rate users in a packet-based radio communication system such as a UMTS TDD system is based on a representation (200) of the resource space organized orthogonally in 3 dimensions by codes, timeslots and frames. The representation (200) is searched to identify new resources that may be allocated and updated when new resources have been allocated. This scheme provides an efficient method for placing allocated resources into the system resource space while maintaining efficient packing, and provides the following advantages: allocations that result in different overall throughput rates can be made to users; efficient packing of allocated resources means that wasted resources is minimized; since the representation of the system resource space is bounded, the stored information at the resource allocator function (in the radio access network) can be minimized; allocations are only made based on the most current frame in the representation of the system resource space this reduces required complexity; and the maximum number of frames into the future over which resources can be allocated can be used to modify the shape of allocations.

8 Claims, 5 Drawing Sheets

When resources are placed into the representation of the system resource space then the allocation is signalled to the user

RESOURCE ALLOCATION IN A PACKET-BASED RADIO COMMUNICATION SYSTEM

CROSS-REFERENCE TO RELATED APPLICATIONS

This application is a Continuation of U.S. patent application Ser. No. 10/277,545, filed on Oct. 22, 2002, which claims the benefit of United Kingdom patent application number 0125390.5, filed Oct. 23, 2001, each of which are incorporated herein by reference in their entirety for all purposes.

FIELD OF THE INVENTION

This invention relates to packet based radio communication systems, and particularly (though not exclusively) to UMTS TDD mode.

BACKGROUND OF THE INVENTION

In UMTS (Universal Mobile Telecommunication System) TDD (Time Division Duplex) mode, as known from the 3rd Generation Partnership Project, the allocation of resources to users is problematic since there are 3 dimensions in which resource exists-codes, timeslots and frames. It is also likely that different users will be allocated different throughput rates. The problem is exacerbated in packet-switched applications when allocations are made very frequently for short periods of time.

In these circumstances it is important that the system resource space is efficiently filled otherwise overall system throughput will be reduced. In addition, the processing and memory requirements should also be considered.

Previous work has concentrated almost entirely on the much simpler case of circuit-switched applications. Under these circumstances allocations to users exist for long periods of time and do not change, which is very different to the packet-switched case.

However, application of circuit-switched techniques to packet-switched systems has the disadvantage(s) that since users are serviced with variable rates in each frame, different numbers of resource units will be allocated to users in any given frame. Also, since previous allocations may still exist, allocating resources to users correctly is likely to be problematic.

A need therefore exists for resource allocation for variable rate users wherein the abovementioned disadvantage(s) may be alleviated.

STATEMENT OF INVENTION

In accordance with a first aspect of the present invention there is provided a method for resource allocation in a packet-based radio communication system, the method comprising:

providing a representation of resource space of the system organized by codes, timeslots and frames; and allocating resources of the system in accordance with the representation.

In accordance with a second aspect of the present invention there is provided an arrangement for resource allocation in a packet-based radio communication system, the arrangement comprising:

a representation of resource space of the system organized by codes, timeslots and frames; and means for allocating resources of the system in accordance with the representation.

BRIEF DESCRIPTION OF THE DRAWINGS

One 3-dimensional resource allocation scheme for variable rate users incorporating the present invention will now be described, by way of example only, with reference to the accompanying drawings, in which.

DESCRIPTION OF PREFERRED EMBODIMENT

Figure 1:
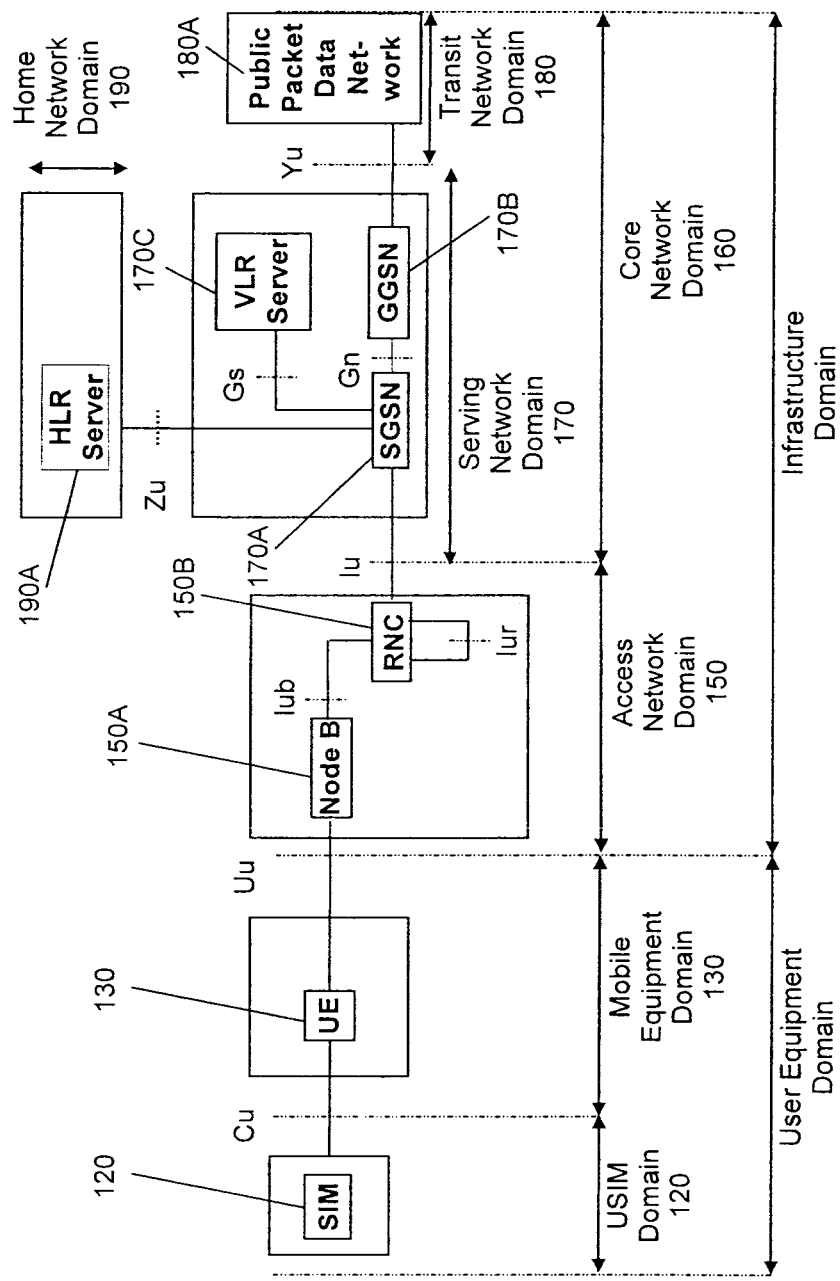
FIG. 1 shows a block diagrammatic representation of a 3GPP system in which the present invention is used.

Referring firstly to FIG. 1, a typical, standard UMTS network (100) is conveniently considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile equipment domain (130), user equipment UE (130A) receives data from a user SIM (120A) in the USIM domain 120 via the wired Cu interface. The UE (130A) communicates data with a Node B (150A) in the network access domain (150) via the wireless Uu interface. Within the network access domain (150), the Node B (150A) communicates with a radio network controller or RNC (150B) via the Iub interface. The RNC (150B) communicates with other RNC's (not shown) via the Iur interface. The RNC (150B) communicates with a SGSN (170A) in the serving network domain (170) via the Iu interface. Within the serving network domain (170), the SGSN (170A) communicates with a GGSN (170B) via the Gn interface, and the SGSN (170A) communicates with a VLR server (170C) via the Gs interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown the FIG. 1.

The RNC (150B) is the UTRAN (UMTS Terrestrial Radio Access Network) element responsible for the control and allocation of resources for numerous Node B's (150A); typically 50 to 100 Node B's may be controlled by one RNC. The RNC also provides reliable delivery of user traffic over the air interfaces. RNC's communicate with each other (via the interface Iur) to support handover and macrodiversity.

The SGSN (170A) is the UMTS Core Network element responsible for Session Control and interface to the Location Registers (HLR and VLR). The SGSN is a large centralized controller for many RNCs.

The GGSN (170B) is the UMTS Core Network element responsible for concentrating and tunneling user data within the core packet network to the ultimate destination (e.g., internet service provider-ISP).

The present invention is based on the concept of a representation of the system resource space, typically held in the or each RNC (150B), that enables the effective placing and subsequent signaling to users of allocated resources.

Figure 2:
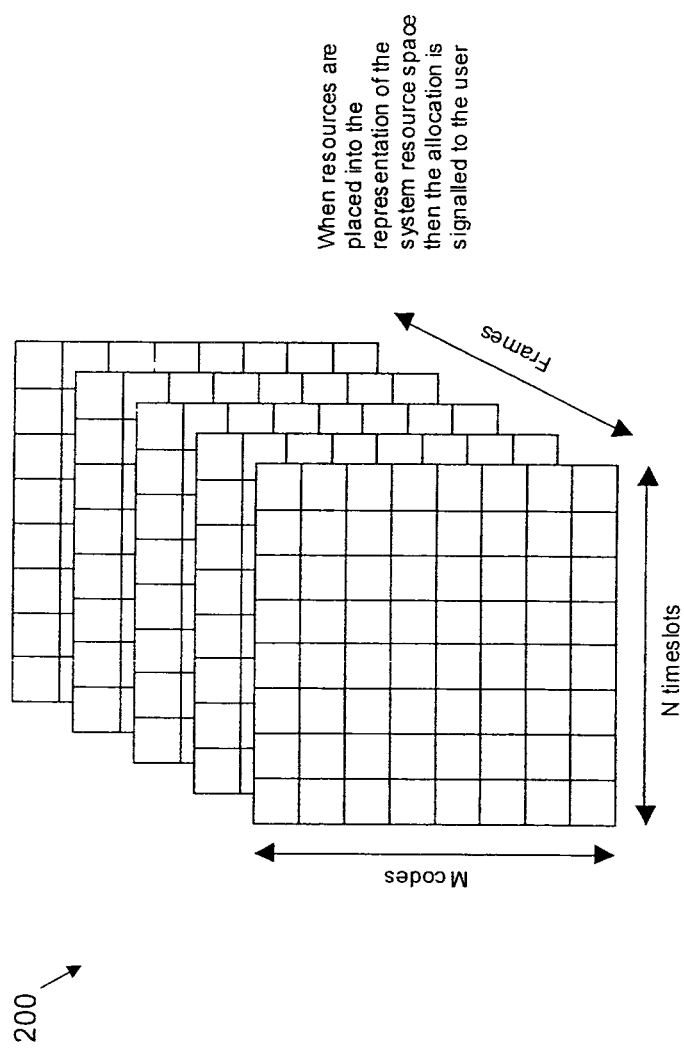
FIG. 2 shows a representation of the system resource space for the system of FIG. 1 operating in TDD mode.

FIG. 2 shows a representation 200 of the system resource space for a system where units of allocated resource can be characterized by the combination of a single timeslot, a single code and a single frame, an example of this is TDD mode in 3GPP (3rd Generation Partnership Project) UMTS. In the figure the system has M codes and N timeslots. The number of frames however is undefined as these may be allocated infinitely into the future. As can be seen from the figure, the representation is organized in an orthogonal, 3-dimensional manner by codes, timeslots and frames.

Figure 3:
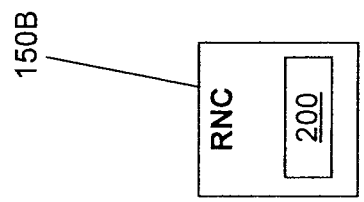
FIG. 3 shows a block diagrammatic representation of an RNC element of the system of FIG. 1 incorporating the system resource space representation of FIG. 2.

In keeping with the present invention, the resource allocator function can keep (in the RNC within the radio access network, as shown in FIG. 3) the representation 200 of this system resource space. When the resource is signalled out to the user, it is also recorded in the representation 200 of the system resource space which is kept in the resource allocator function. The allocation to a particular user is recorded by placing a number that represents the user into the corresponding location in the representation 200 of the system resource space. It will be appreciated that the representation 200 of the system resource space is conveniently held in memory such as RAM within the RNC 150B.

Figure 4:
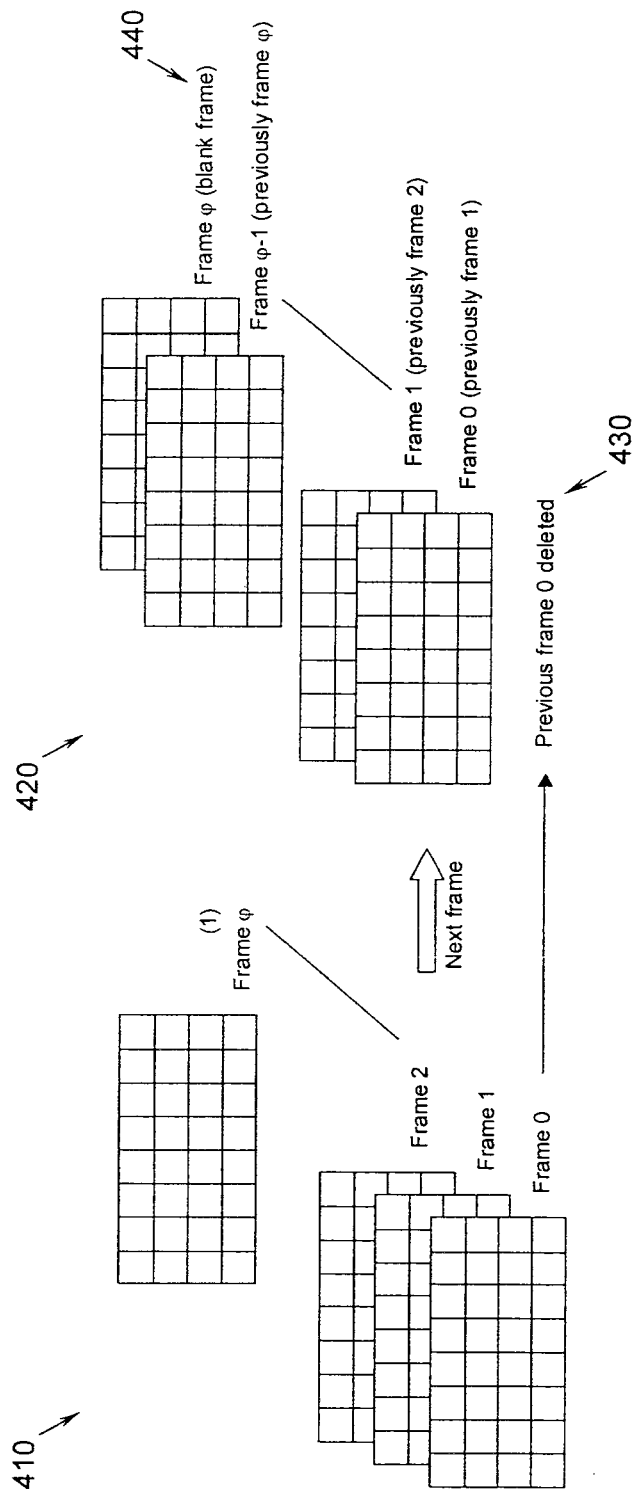
FIG. 4 shows how the representation of the system resource space is updated each frame.

FIG. 4 shows how the representation of the system resource space is updated each frame.

Clearly, it is very difficult to maintain a store of the system resource space that extends for an infinite number of frames into the future. Therefore the number of frames into the future over which an allocation can extend is limited to $\Phi+1$ frames (0 to $\Phi$, as shown in the figure).

The representation of the system resource space must be updated each frame, and FIG. 4 illustrates the updating which occurs between a first frame stage 410 and a second frame stage 420. It is clear that the most current frame can be removed (as indicated at 430) from the representation of the system resource space as the frame that corresponds to these resources has passed so nothing can now be allocated into this frame. Additionally, a new frame that is completely blank is inserted (as indicated at 440) into the representation of the system resource space at the back of the representation of the system resource space, i.e., at frame $\Phi(\mathbf{3})$.

Figure 5:
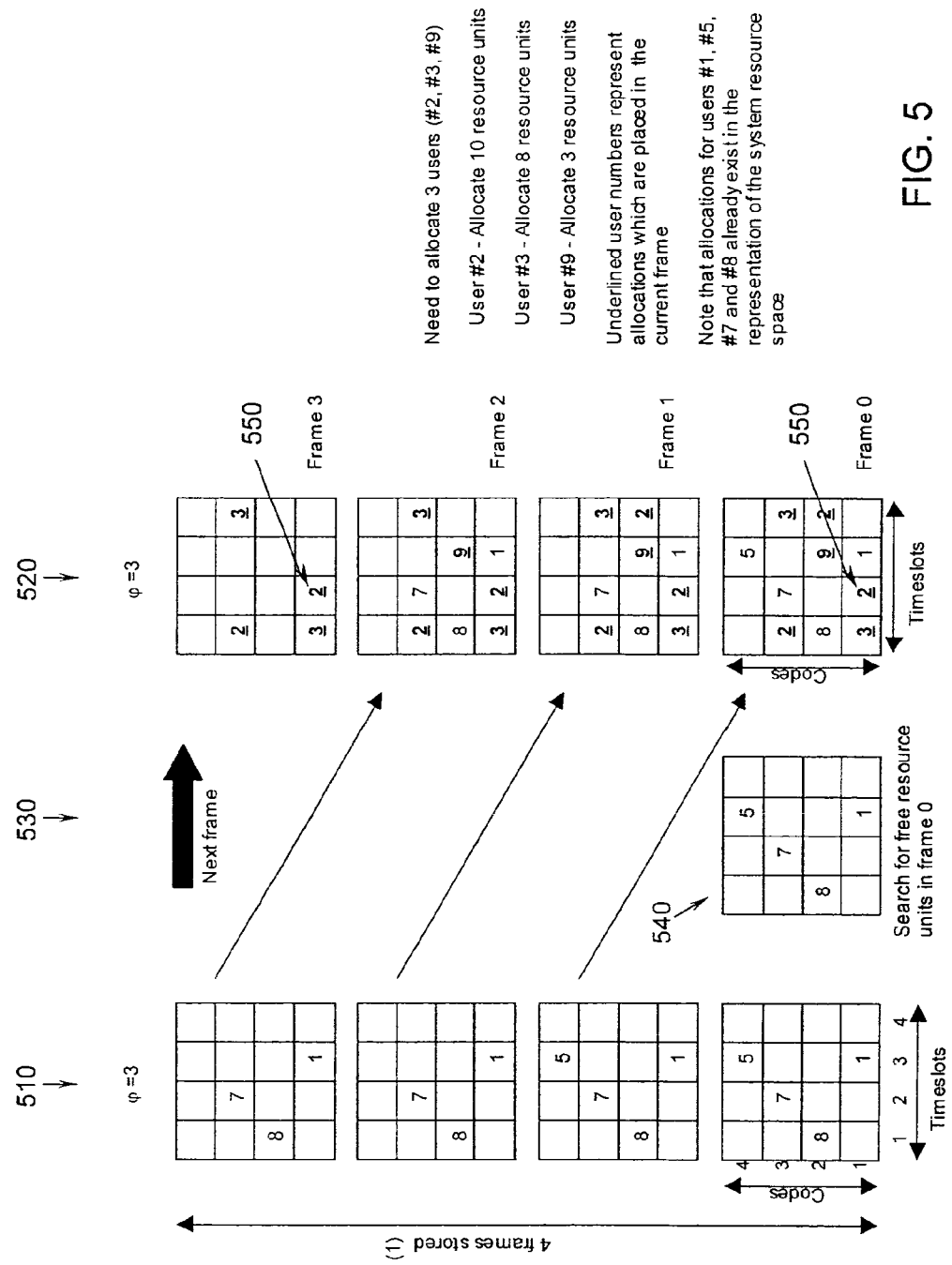
FIG. 5 shows an example of system resource allocation incorporating the present invention.

FIG. 5 shows a simple example of how the invention works, and the figure illustrates the updating which occurs between a first frame stage 510 and a second frame stage 520 (via an intermediate searching stage 530, as will be explained below).

In this example, users are numbered #1 to #9, and the number of frames into the future up to which allocation can be made, ø, is set to 3 so a total of 4 frames are stored in the resource allocator function as shown.

A separate algorithm, which need not be described in further detail, determines how many resource units are allocated to each user in every frame. In the example below, 10 resource units are allocated to user #2, 8 resource units are allocated to user #3 and 3 resource units are allocated to user #9.

These allocated resources can only be placed into the representation of the system resource space where there is no previous allocation (i.e., where no user number exists).

Since allocated resources cannot be placed where a previous allocation has been placed, a search must be made of the representation of the system resource space for free resource units. It is possible to search the entire representation of the system resource space. However it is not necessary to do this, and in order to simplify the search procedure only the front face of the representation of the system resource space (i.e., the most current frame, frame 0) is searched.

A search of frame 0 of the representation of the system resource space is conducted (as indicated at 540). A random selection of the free resource units is made and the allocated resource units are placed into this selection by placing the number of the user in the corresponding location in the representation of the system resource space (as indicated at 550). While there are resource units to be placed, the same code/timeslot location is used but forward in frames until frame $\Phi$(is reached (as indicated at 560). This process is repeated until all resource units are placed.

For example, user #2 is allocated 10 resource units:
Frame 0 is searched for free resource units.
From the set of free resource units a random decision is made and in this case timeslot 2, code 1 is selected.
4 resource units are placed in this location up until frame $\Phi$.
4 more resource units for user #2 are placed in the timeslot 1, code 3 location from frame 0 to frame.
Only 2 resource units are left to be placed in timeslot 4, code 2 for frames 0 and 1.

Note that if no free resource units are found in frame 0 then allocations are not placed into the representation of the system resource space.

Finally, once all allocated resources are placed into the representation of the system resource space, the users are signaled with the appropriate indication of codes, timeslots and frames. For example, user #9 is signalled with timeslot 3, code 2 and allocation is for 3 frames; these resources are then used for transporting data. It will be appreciated that the method described above for 3-dimensional resource allocation for variable rate users may be carried out principally in software running on a processor (not shown), and that the software may be provided as a computer program element carried on any suitable data carrier (also not shown) such as a magnetic or optical computer disc.

It will be also be appreciated that the arrangement described above for 3-dimensional resource allocation for variable rate users may be provided in an integrated circuit (not shown) such as an FPGA (Field Programmable Gate Array) or ASIC (Application Specific Integrated Circuit).

It will be understood that the scheme for 3-dimensional resource allocation for variable rate users described above provides the following advantages:

Allocations that result in different overall throughput rates can be made to users.

Efficient packing of allocated resources means that wasted resources is minimized.

Since the representation of the system resource space is bounded. The stored information at the resource allocator function (in the radio access network) can be minimized.

Allocations are only made based on the most current frame in the representation of the system resource space, reducing required complexity.

The maximum number of frames into the future over which resources can be allocated, $\Phi$, can be used to modify the shape of allocations.

The invention claimed is:
1. A non-transitory computer readable storage medium encoded with computer program instructions, which when executed by a computer implement a method for resource allocation, in a packet based radio communication system, the method comprising:

providing 3-dimensional information indicating an amount of available network of the system organized by codes, timeslots and frames;

searching the 3-dimensional information to identify new resources that may be allocated, wherein the searching comprises searching the 3-dimensional information only for a current frame located at the front of the resource space; and allocating resources of the system at a selected location in the current frame and at the selected location in another frame.

2. The non-transitory computer readable storage medium of claim 1, wherein the 3-dimensional information is organized orthogonally by codes, timeslots and frames.

3. The non-transitory computer readable storage medium of claim 1, wherein the step of allocating includes storing in the 3-dimensional information a user number indicating the code, timeslot and frame allocated to the user.

4. The non-transitory computer readable storage medium of claim 1, wherein the step of allocating includes updating the 3-dimensional information when new resources have been allocated.

5. The non-transitory computer readable storage medium of claim 1, wherein the 3-dimensional information is stored in a radio network controller of the system.

6. The non-transitory computer readable storage medium of claim 1, wherein the packet-based radio communication system is a UMTS system.

7. The non-transitory computer readable storage medium of claim 1, wherein the selected location in the current frame is selected randomly from a set of available locations.

8. The non-transitory computer readable storage medium of claim 7, wherein the resources allocated at the selected location in the current frame are also allocated at the selected location in all subsequent frames.

* * * * *